United States Patent [19]
Pascoe et al.

[11] Patent Number: 6,149,172
[45] Date of Patent: Nov. 21, 2000

[54] MODULAR POWER STEP

[76] Inventors: David Mark Pascoe, 1037 Pritchard Place, Newmarket, Ontario, Canada, L3V 8K4; Brad E. Watson, 63 William Street, Sharin, Ontario, Canada, L0G 1V0

[21] Appl. No.: 09/233,322

[22] Filed: Jan. 20, 1999

[51] Int. Cl.⁷ .................................................. B60R 3/00
[52] U.S. Cl. .......................... 280/166; 280/163; 280/169
[58] Field of Search ............................... 280/166, 164.1, 280/169, 163, 165

[56] References Cited

U.S. PATENT DOCUMENTS

| | | | |
|---|---|---|---|
| 3,164,394 | 1/1965 | Husko et al. | 280/166 |
| 3,403,926 | 10/1968 | Way et al. | 280/166 |
| 3,758,134 | 9/1973 | Stewart | 280/166 |
| 3,762,742 | 10/1973 | Bucklen | 280/166 |
| 3,784,227 | 1/1974 | Rogge | 280/166 |
| 3,817,554 | 6/1974 | Cuffe et al. | 280/166 |
| 3,833,240 | 9/1974 | Weiler | 280/166 |
| 3,883,844 | 5/1975 | Wood, II | 340/52 R |
| 3,887,217 | 6/1975 | Thomas | 280/166 |
| 3,915,475 | 10/1975 | Casella et al. | 280/166 |
| 4,073,502 | 2/1978 | Frank et al. | 280/166 |
| 4,089,538 | 5/1978 | Eastridge | 280/166 |
| 4,110,673 | 8/1978 | Nagy et al. | 318/466 |
| 4,185,849 | 1/1980 | Jaeger | 280/166 |
| 4,306,830 | 12/1981 | Le Duc | 414/343 |
| 4,623,160 | 11/1986 | Trudell | 280/166 |
| 5,085,450 | 2/1992 | DeHart, Sr. | 280/166 |
| 5,224,723 | 7/1993 | Hatas | 280/166 |
| 5,342,073 | 8/1994 | Poole | 280/166 |
| 5,375,864 | 12/1994 | McDaniel | 280/166 |
| 5,498,012 | 3/1996 | McDaniel et al. | 280/166 |
| 5,513,866 | 5/1996 | Sisson | 280/166 |
| 5,538,269 | 7/1996 | McDaniel et al. | 280/166 |
| 5,697,626 | 12/1997 | McDaniel et al. | 280/166 |
| 5,842,709 | 12/1998 | Maccabee | 280/166 |
| 5,957,237 | 9/1999 | Tigner | 182/127 |

FOREIGN PATENT DOCUMENTS

| | | | |
|---|---|---|---|
| 0559624 A1 | 9/1993 | European Pat. Off. | B60R 3/02 |
| 0882388 A1 | 12/1998 | European Pat. Off. | A01D 41/12 |
| 1125302 | 3/1962 | Germany . | |
| 2910812 | 10/1980 | Germany | B60R 3/02 |
| 3242134 C2 | 8/1989 | Germany | B60R 3/02 |
| 2303350 | 2/1997 | United Kingdom | B60K 3/02 |

OTHER PUBLICATIONS

International Search Report mailed May 20, 1999 re: PCT/CA99/00023.

*Primary Examiner*—J. J. Swann
*Assistant Examiner*—James S. McClellan
*Attorney, Agent, or Firm*—Pillsbury Madison & Sutro LLP

[57] ABSTRACT

A power-retractable step assembly for a motor vehicle comprises a substantially sealed housing assembly, a pivoting structure including a step structure, a gear assembly, and a motor assembly. The step structure presents an upper load carrying surface, and the pivoting structure is mounted for pivotal movement about an axis. The gear assembly is disposed in the sealed housing assembly and coupled to the pivoting structure. The motor assembly is drivingly coupled with the gear assembly and is constructed and arranged to pivot the pivoting structure about the axis and thereby drive the pivoting structure between deployed and stored positions. The step structure is moved in an outboard vehicle direction when the pivoting structure is moved from the stored position to the deployed position, and is also moved in a fore-aft vehicle direction when the pivoting structure is moved between the stored and deployed positions. The axis is disposed at an angle such that, as the axis extends upwardly, i) the axis extends in the outboard vehicle direction and ii) the axis extends in a same fore-aft vehicle direction as the fore-aft direction that the step structure moves when the pivoting structure is moved from the stored position to the deployed position.

13 Claims, 12 Drawing Sheets

MODULAR POWER STEP

FIELD OF THE INVENTION

The present invention relates to step structures used to assist passengers entering and exiting high ground clearance vehicles.

BACKGROUND OF THE INVENTION

In recent years, the popularity of sport utility vehicles has risen tremendously. Because of the high ground clearance of these vehicles, the vehicle floor level is higher than that of a typical passenger automobile. Some individuals have experienced difficulty entering and exiting sport utility and similar high ground clearance vehicles.

Step structures have been used to assist passengers in entering and exiting high ground clearance vehicles. The conventional step structures have typically included a variety of stationary step or bar structures rigidly mounted to the vehicle. Stationary step structures have many disadvantages, however. For example, if a stationary step structure is positioned at an optimum height to help most passengers, the stationary step structure reduces ground clearance of the vehicle. If the stationary step structure is positioned so that desirable ground clearance is maintained, the stationary step structure is too high to help most passengers enter or leave the vehicle. Stationary step structures also detract from the vehicle styling, undesirably increase the vehicle width, and may even increase the vehicle width beyond the legal limit. Most stationary step structures are also very narrow in the transverse or cross-vehicle direction and present only a small stepping surface for a passenger's foot.

The patent literature has proposed various retractable vehicle step structures in order to resolve some of the problems associated with stationary step structures. For example, U.S. Pat. No. 3,762,742 proposes to provide a step that is pivoted about an axis that is angled in an outboard direction as it extends upwardly. While such angling of the pivotal axis enables the step structure to be positioned closer to the ground when deployed in comparison to its position when stored, the optimum step structure positioning in the two positions is not achieved. In addition, many of the proposed retractable step structures, such as that disclosed in the aforementioned '742 patent, do not provide the moving mechanical parts of the retractable step structure with effective protection from the environment or from damage caused by dirt and other objects thrown by the vehicle wheels when the vehicle is moving.

It is an object of the present invention to overcome the disadvantages of the proposed prior art devices as discussed above. Accordingly, the present invention provides a power-retractable step assembly for a motor vehicle comprising a substantially sealed housing assembly, a pivoting structure including a step structure, a gear assembly, and a motor assembly. The step structure presents an upper load carrying surface, and the pivoting structure is mounted for pivotal movement about an axis. The gear assembly is disposed in the sealed housing assembly and coupled to the pivoting structure. The motor assembly is drivingly coupled with the gear assembly and is constructed and arranged to pivot the pivoting structure about the axis and thereby drive the pivoting structure between deployed and stored positions. The step structure is moved in an outboard vehicle direction when the pivoting structure is moved from the stored position to the deployed position, and is also moved in a fore-aft vehicle direction when the pivoting structure is moved between the stored and deployed positions. The axis is disposed at an angle such that, as the axis extends upwardly, i) the axis extends in the outboard vehicle direction and ii) the axis extends in a same fore-aft vehicle direction as the fore-aft direction that the step structure moves when the pivoting structure is moved from the stored position to the deployed position.

Furthermore, several of the proposed mechanisms for powered retractable step structures, including the aforementioned '742 patent, do not provide a means for retracting the step from the deployed position in the event of a power failure, or for preventing damage to the step in the event that the deployed step forcibly encounters an object. It is a further object of the present invention to overcome this deficiency. Accordingly, the present invention provides a power-retractable step assembly for a motor vehicle comprising a pivoting structure including a step structure, a gear assembly, a motor assembly, and a spring-biased clutch assembly. The step structure presents an upper load carrying surface. The gear assembly is coupled to the pivoting structure, and the motor assembly is drivingly coupled with the gear assembly. The motor assembly is constructed and arranged to pivot the pivoting structure about the axis and thereby drive the pivoting structure between deployed and stored positions. The step structure moves in an outboard vehicle direction when the pivoting structure is moved from the stored position to the deployed position, and also moves in a fore-aft vehicle direction when the pivoting structure is moved between the stored and deployed positions. The gear assembly includes a worm gear operatively connected to the motor assembly and a meshing gear operatively connected to the pivoting structure. The worm gear and the meshing gear are disposed in cooperative meshing engagement relation that prevents the pivoting structure from backdriving the motor assembly so that the pivoting structure is retained in the deployed position and is inhibited from returning to the stored position after it has reached the deployed position. The spring biased clutch assembly couples the gear assembly with the pivoting structure and includes clutch surfaces normally forced into coupling engagement by a spring structure so that movement of the gear assembly generates corresponding movement of the pivoting structure. The clutch surfaces are capable of relative movement to one another when the pivoting structure is in the deployed position and a greater than threshold force is applied to the pivoting structure to overcome the force provided by the tension spring and thereby enable the pivoting structure to be moved relative to the gear assembly and thus moved towards the stored position.

These and other objects of the invention will become apparent from the following detailed description and appended claims.

DETAILED DESCRIPTION OF THE PREFERRED EMBODIMENTS

Figure 1:
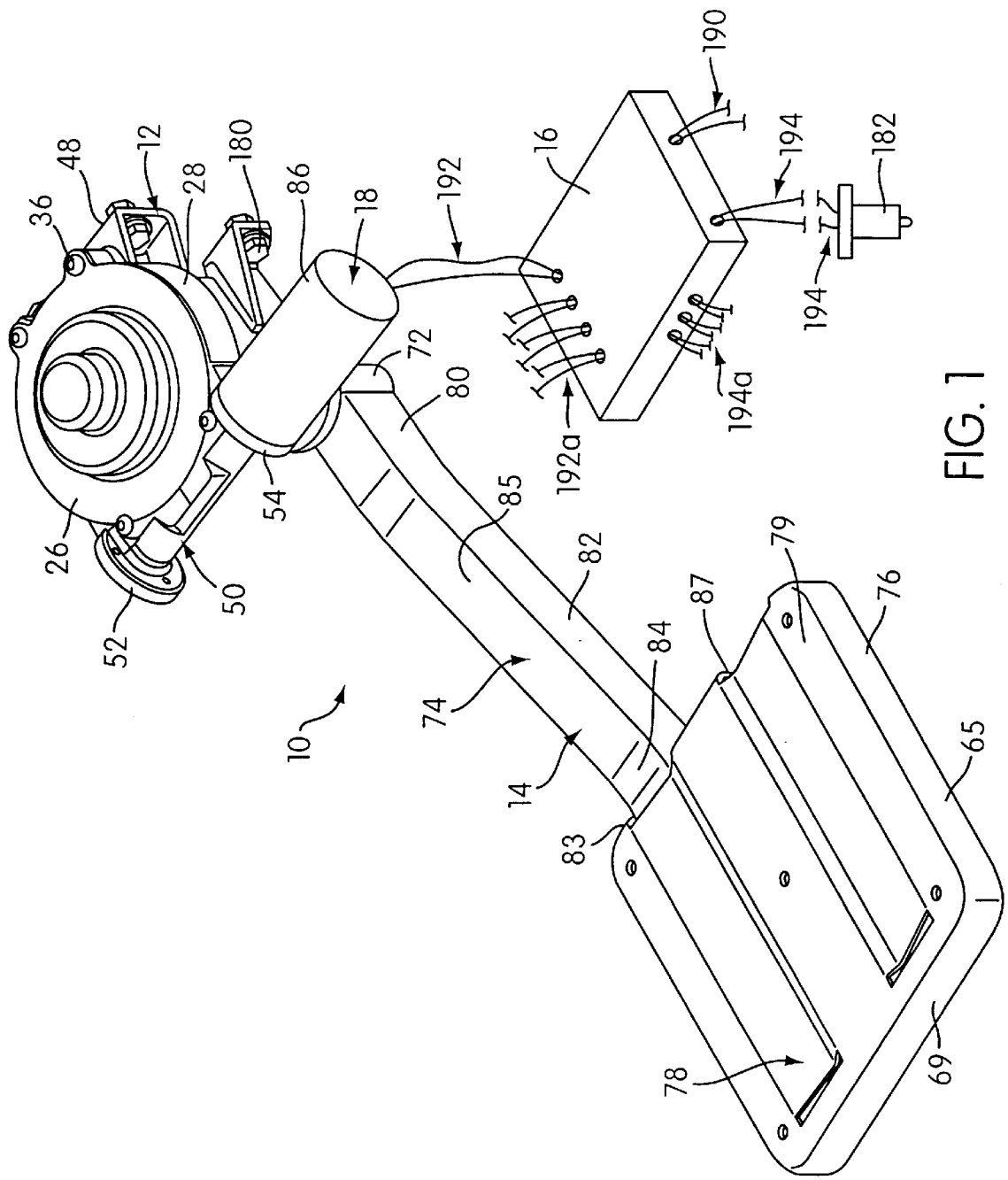
FIG. 1 is a perspective view of a modular power step assembly according to the present invention including an electronic controller assembly thereof and showing a motor vehicle door controlled switching device electrically interconnected to the electronic controller assembly.

A modular power step assembly which overcomes the disadvantages of the prior art is shown in FIGS. 1–10 and is generally indicated by reference numeral 10. The modular power step assembly 10 includes a housing assembly, generally designated 12, a step assembly or pivoting structure, generally designated 14, an electronic control unit 16, a motor assembly, generally designated 18, a worm drive gear assembly, generally designated 20, and a spring loaded clutch assembly, generally designated 22.

Figure 8:
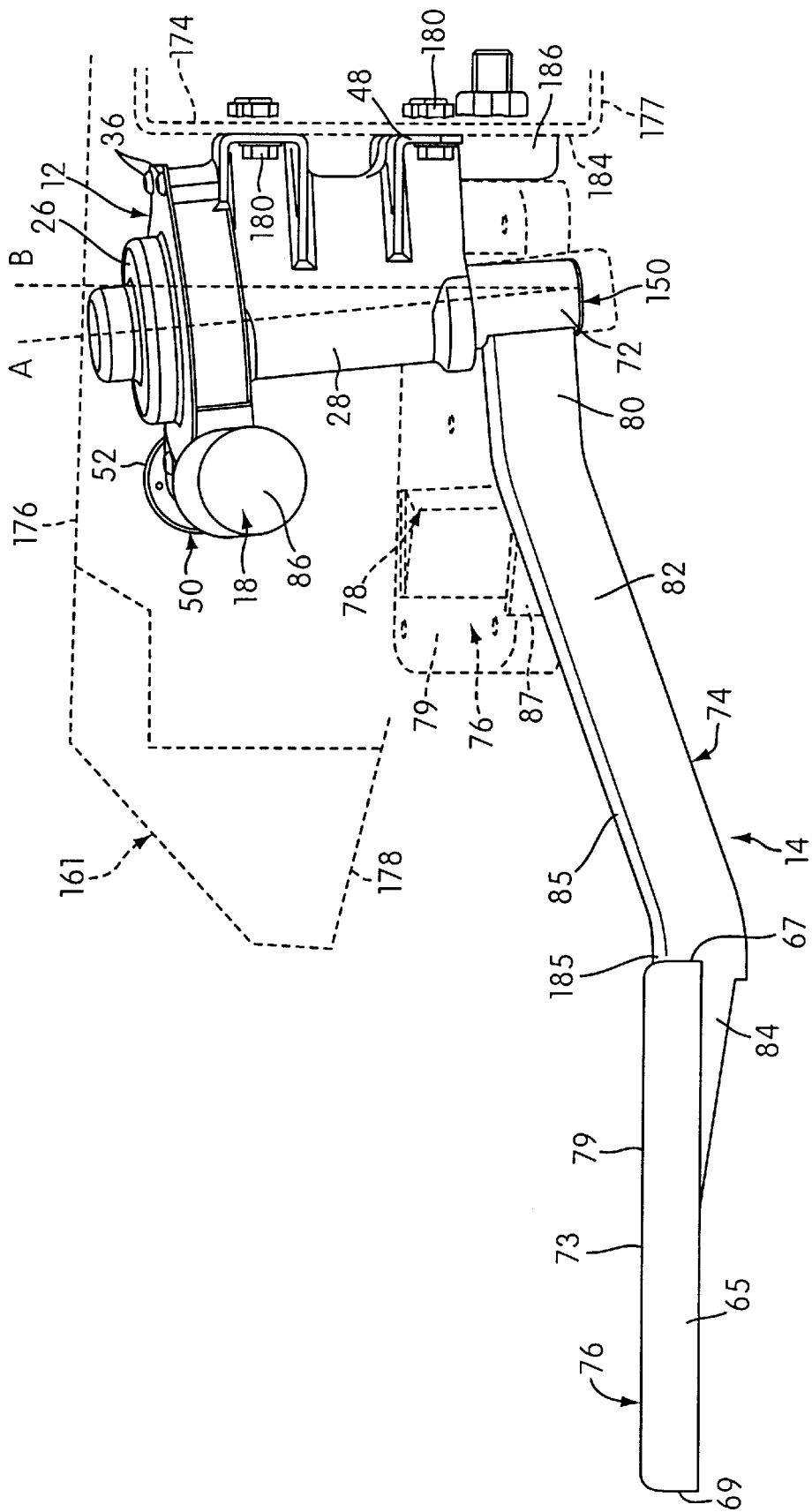
FIG. 8 is a side elevational view of a portion of the modular power step assembly installed on the passenger's side of a vehicle, and showing the step assembly in an extended position in solid lines and in a retracted position in phantom lines.
Figure 9:
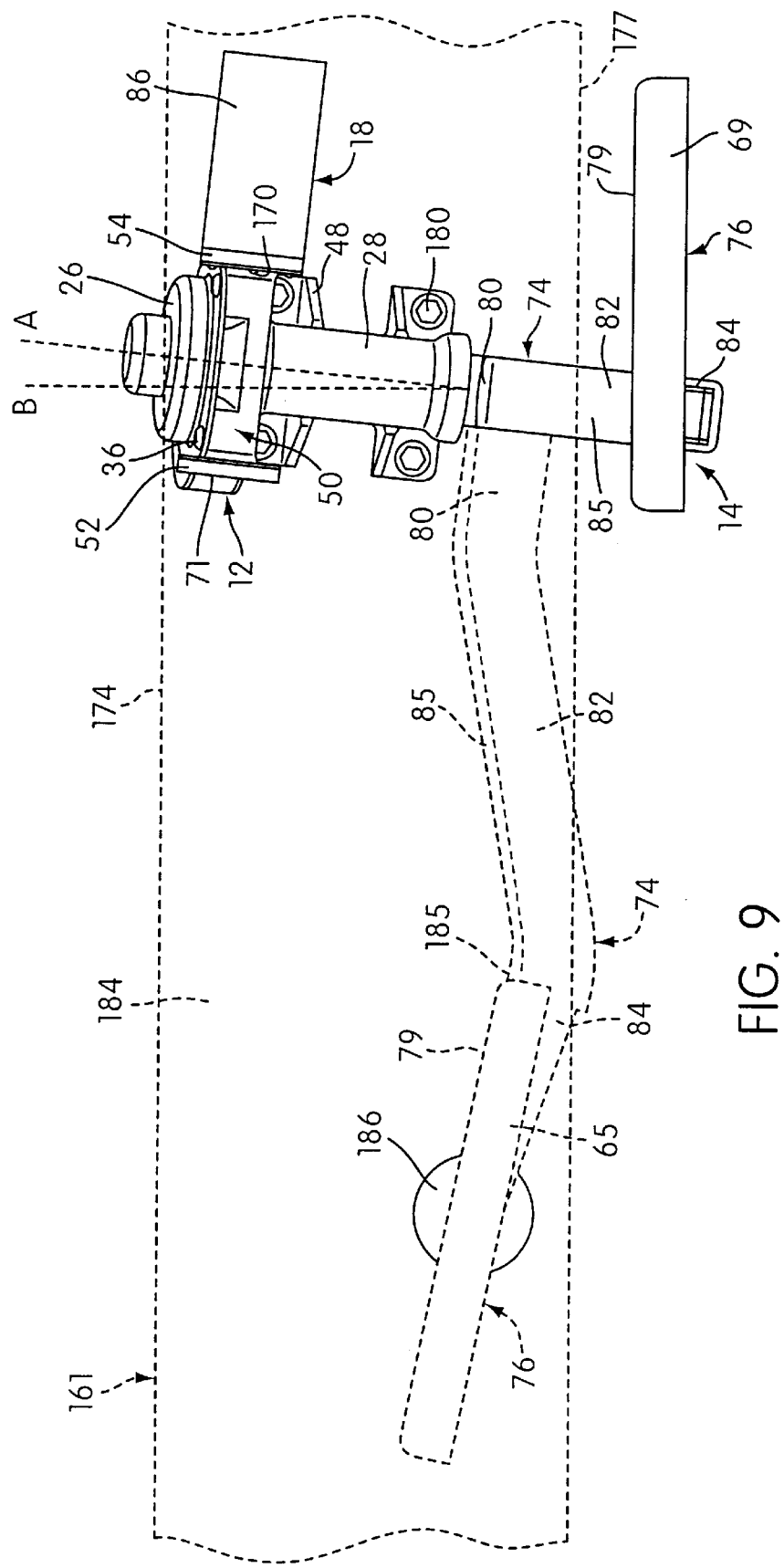
FIG. 9 is a front elevational view showing a portion of the modular power step assembly of FIG. 8 installed on the passenger's side of a vehicle.
Figure 10:
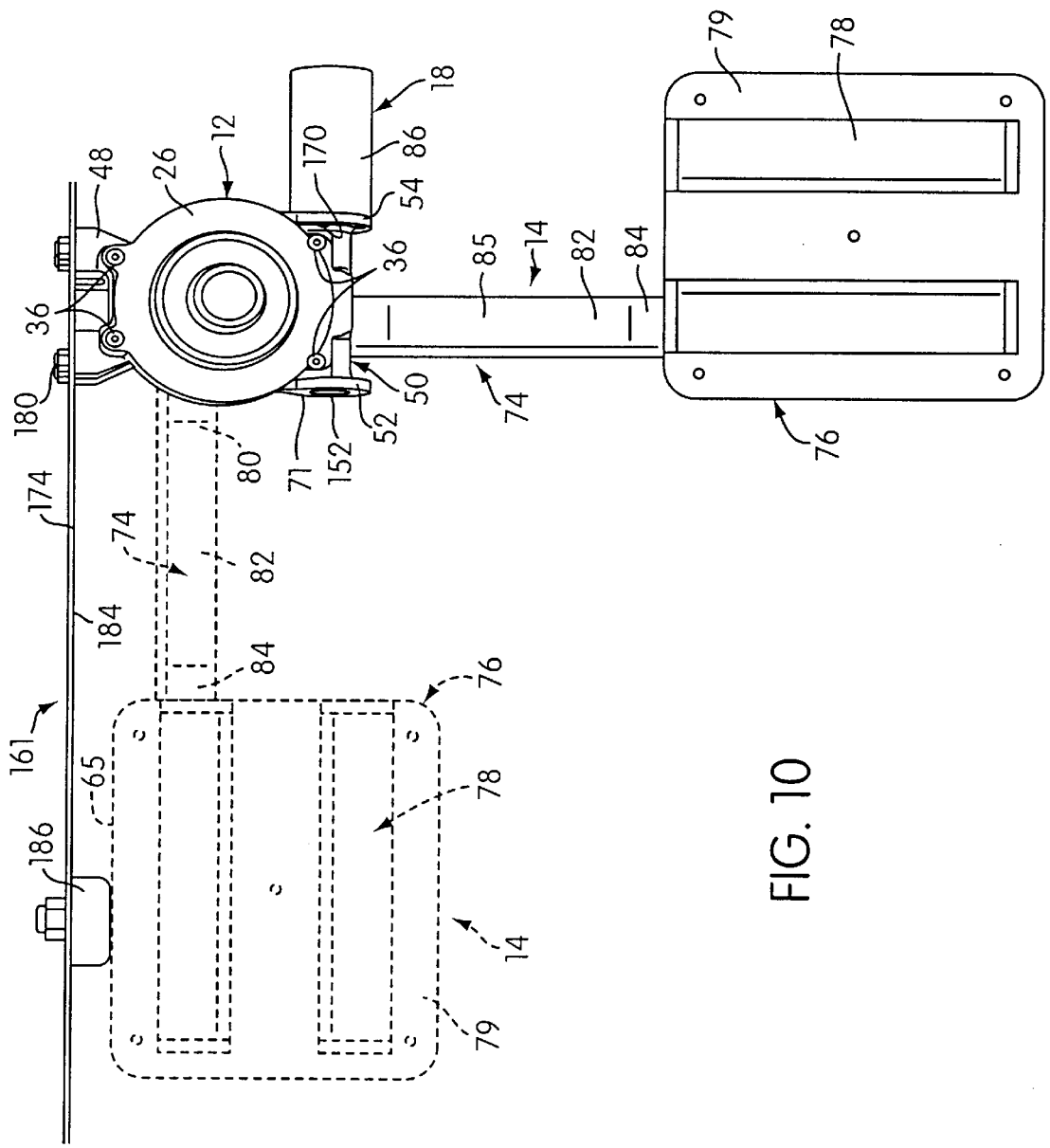
FIG. 10 is a top plan view of a portion of the modular power step assembly of FIG. 8.

The housing assembly 12 is best seen in FIGS. 8–10 and includes a cover structure 26 and a main housing structure 28. The cover structure 26 is secured to the main housing structure 28 by a plurality of cover screws 36. When the cover structure 26 is secured to the housing structure 28, the cover structure 26 and the housing structure 28 cooperate to define a housing assembly chamber 38 within the housing assembly 12, as best seen in the cross-sectional view of FIG. 5. The configuration of the housing assembly chamber 38 includes a lower cylindrical chamber portion 40, an enlarged diameter clutch chamber portion 42, a spring chamber portion 44, and an upper chamber portion 46. The lower cylindrical chamber portion 40 is defined by a hollow cylindrical sleeve portion 39 of the main housing 28. The sleeve portion 39 has a downwardly facing opening 41. The sleeve portion 39 has an interior surface thereof which defines a lower annular recess 43 which surrounds the opening 41. The interior surface also defines a cylindrical recess 45 above the annular recess 43. Recess 43 receives a spring loaded lip seal 37, while recess 45 receives a bushing or bearing 148.

The housing assembly 12 includes a rear bracket 48 and a gear housing portion 50, as can be appreciated in FIG. 8.

Figure 6:
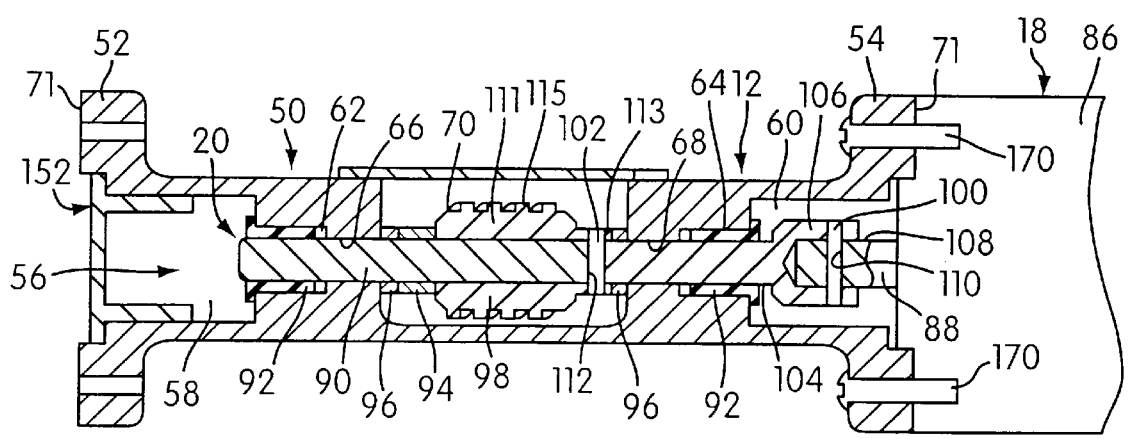
FIG. 6 is a fragmentary cross sectional view of a portion of the modular power step assembly taken through the line 6—6 in FIG. 3.

The housing portion 50, best seen in the cross-sectional view of FIG. 6, defines a plurality of identical, oppositely facing bellhouse structures, including a first bellhouse structure 52 and a second bellhouse structure 54. The housing 50 defines an essentially symmetrical housing chamber 56 as best seen in the cross-sectional view of FIG. 6. The chamber 56 defines two identical cylindrical outer chamber portions 58 and 60, two identical cylindrical intermediate chamber portions 62 and 64 of relatively reduced diameter, two identical cylindrical inner chamber portions 66 and 68 of an even further reduced diameter, and a central chamber 70 which opens into and is continuous with the spring chamber portion 44. The two identical portions 58 and 60, the two identical portions 62 and 64, and the two identical portions 66 and 68 of the housing chamber 56 are symmetric with respect to the longitudinal center axis of the housing chamber 56. Each bellhouse structure 52 and 54 defines a ring-shaped planar surface 71 at the respective ends thereof. The main housing structure 28 and cover structure 26 are preferably a cast aluminum component, although any suitable material known in the art can be used.

The pivoting structure 14 is best seen in FIGS. 2–5 and 8–10 and preferably includes an axially rotatable tube structure 72, a tubular arm structure, generally designated at 74, and a step structure, generally designated at 76. The tube structure 72 is rotatably received within sleeve portion 39 of housing assembly 12. Bushing 148 facilitates rotation of the tube structure 72. One end of tubular arm structure 74 is welded to the smooth cylindrical exterior surface of the lower end of tube structure 72. The opposite end of arm structure 74 mounts the step structure 76.

A plurality of circumferentially spaced broached grooves 77 are formed on the smooth exterior cylindrical surface towards the upper portions of the tube structure 72. Each of the broached grooves 77 extends partially circumferentially around the exterior cylindrical surface of the rotatable tube structure 72. The rotatable tube structure 72 also defines an upper annular groove 73 and a lower annular groove 75 disposed below broached grooves 77. The function of such grooves will be described in detail later.

The step structure 76 is best seen in FIGS. 1–4 and 8–10. The step structure 76 has an essentially rectangular top wall 73 providing an upwardly facing treaded surface 79. The step structure 76 includes longitudinally extending side walls 65, each of which extends essentially perpendicularly downwardly from the lateral edge portions of the top wall 73 of the step structure 76 and are parallel to one another. The proximal end wall 67 defines a plurality of notches, including a first notch 83 and a second notch 87, best seen in FIG. 2. The notches 83 and 87 are symmetrically disposed with respect to an imaginary plane parallel to side walls 65 and bisecting upper wall 73.

Figure 2:
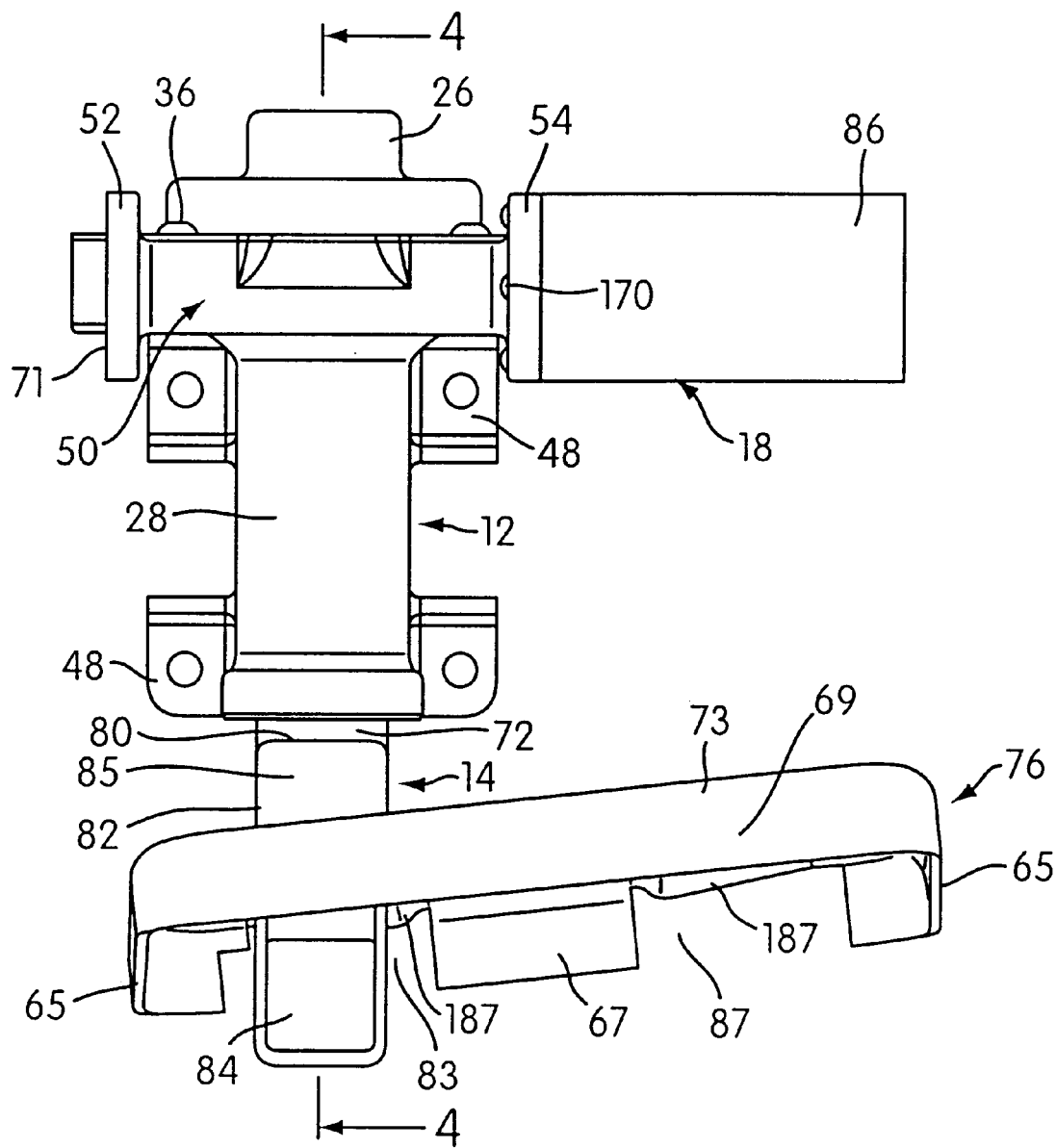
FIG. 2 is a front elevational view of a portion of the modular power step assembly including a housing assembly, a motor assembly and a step assembly thereof shown in an extended position.
Figure 3:
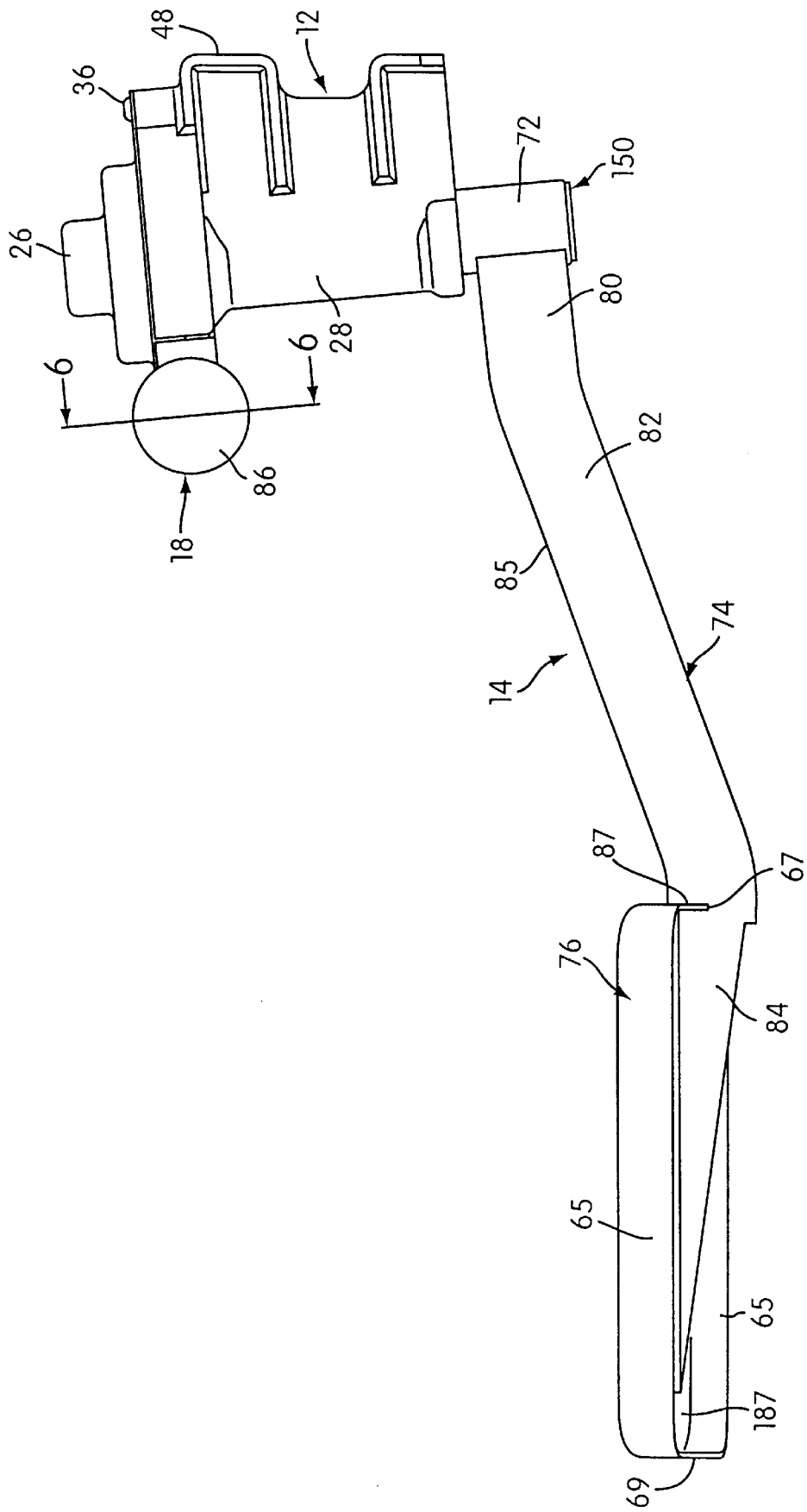
FIG. 3 is a side elevational view of a portion of the modular power step assembly of FIG. 2.
Figure 4:
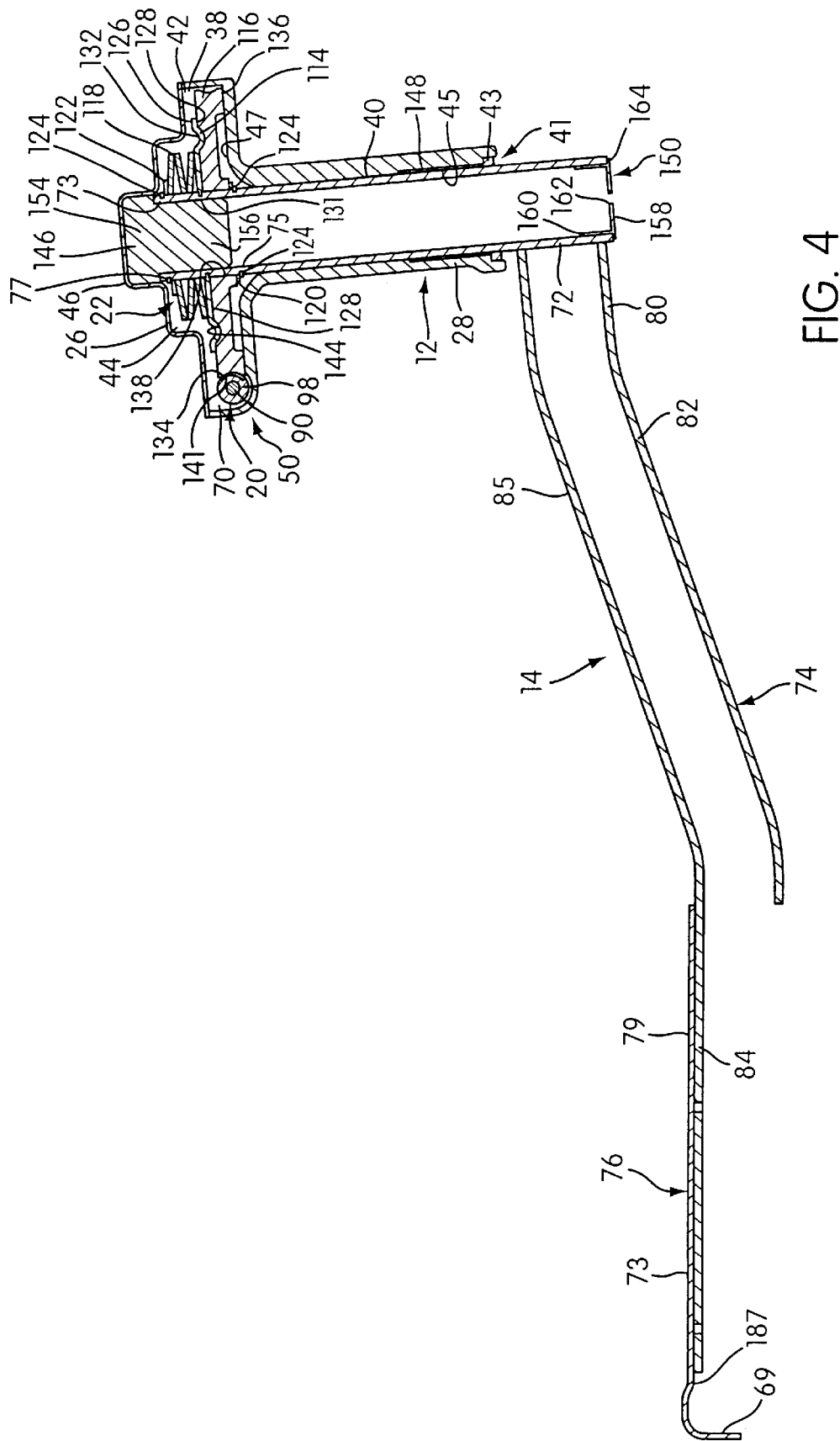
FIG. 4 is a cross sectional view taken through the line 4—4 in FIG. 2.

The arm structure 74 includes a relatively short first arm portion 80, an elongated central second arm portion 82, and a relatively short third arm portion 84. The arm structure 74 has a top surface 85. The top surface 85 of the short third arm portion 84 is substantially planar and is secured to a bottom surface 187 of the step structure 76 top wall 73, as best seen in FIG. 4. In the embodiment shown, the short third arm portion 84 extends through the first notch 83 in the proximal end wall 67. This is best seen in FIG. 2. When the arm structure 74 is so secured to the step structure 76, the symmetric step structure 76 is asymmetrically positioned on the arm structure 74. It can be appreciated, as will be described later in greater detail, that the short arm portion 84 can also be received in notch 87 for securement to the step structure in other arrangements of the power step assembly 10.

The gear assembly 20 and the spring loaded clutch assembly 22 are enclosed within the housing assembly 12. The gear assembly 20 is best seen in the perspective view of FIG. 7 and the cross-sectional view of FIG. 6. The gear assembly 20 includes a worm drive shaft member 90, a plurality of identical longitudinally spaced worm drive bushings 92, a spacer washer member 94, a plurality of thrust washers 96, a worm member 98, a first retainer pin member 100, and a second retainer pin member 102. The worm drive shaft member 90 has a radially enlarged end portion 106. The enlarged end portion 106 defines a longitudinally extending central bore 108, and a transversely extending first aperture 110 intersecting the bore 108. The enlarged end portion 106 is used to connect shaft 106 to motor assembly 18 as will be described later.

The worm member 98 can be of any conventional configuration and is fixed to shaft 90 for rotation therewith. The worm member 98 shown in the drawings includes a radially enlarged cylindrical portion 111 and a radially smaller cylindrical portion 113. The second retainer pin member 102 extends through an aperture 112, which extends through the cylindrical portion 113 and the shaft 90 to rotatably couple the shaft 90 with the worm member 98. The spacer washer member 94 keeps the asymmetrical worm member 98 symmetrically positioned within the central chamber 70 of the gear housing portion 50. More specifically, the pair of thrust washer members 96, the spacer washer member 94, and the worm member 98 surround the portion of the worm drive shaft member 90 that extends through the central chamber 70 of the bellhouse bore 56, as best seen in the cross-sectional view of FIG. 6. The spacer washer member 94 is positioned adjacent the enlarged cylindrical portion 111 of the worm member 98. The first thrust washer member 96 is mounted on the worm drive shaft member 90 and is positioned between the gear housing 50 and the spacer washer member 94. The second thrust washer member 96 is mounted on the worm drive shaft member 90 and is positioned between the small cylindrical portion 113 of the worm member 98 and the gear housing 50. The spacer washer member 94, thrust washer members 96, and the small cylindrical portion 113 of the worm member 98 cooperate to hold the enlarged cylindrical portion 111 of the worm member 98 in a central portion of the central chamber 70 of the bellhouse bore 56. A plurality of spiral threads 115 are defined on the exterior cylindrical surface of the enlarged cylindrical portion 111.

As shown in FIG. 6, the motor assembly 18 includes a casing structure 86 which contains a conventional position sensing and encoding electrical motor (not shown) which is capable of bi-directionally rotating a conventional motor shaft structure 88. It should be appreciated that the casing structure 86 may optionally be considered as part of the entire housing assembly 12, which housing assembly maintains the gear and motor components sealed from the external environment.

The manner in which the motor assembly 18 is mounted to the housing assembly 12 is best seen in the cross-sectional view of FIG. 6, which shows that the motor assembly 18 is secured to the ring-shaped planar surface 71 of the second bellhouse structure 54 with a plurality of fasteners 170. The motor shaft structure 88 extends partially within the chamber portion 60 of the bellhouse structure 54. The motor shaft structure 88 is received within the central bore 108 of the enlarged end portion 106 of the worm drive shaft member 90, and the worm drive shaft member 90 is fixed for rotation with the motor shaft structure 88 by the first retainer pin member 100. Particularly, the pin 100 extends through the aperture 110 in the enlarged end portion 106 of the worm drive shaft member 90 and an aligned aperture in the motor shaft 88. The cylindrical shaft portion 104 of the worm drive shaft member 90 extends rotatably through the cylindrical chamber portion 60, through both cylindrical chamber portions 62 and 64, through both cylindrical chamber portions 66 and 68 and through the central chamber 70 of the bellhouse bore 56. One worm drive bushing member 92 is secured within each of the cylindrical second portions 62 and 64 of the bellhouse bore 56 and each surrounds a portion of the cylindrical shaft portion 104 of the worm drive shaft 90. The worm drive bushing members 92 secured within each of the cylindrical second portions 62 and 64 of the bellhouse bore 56 mount the worm drive shaft member 90 for low friction rotation within the housing portion 50.

Figure 5:
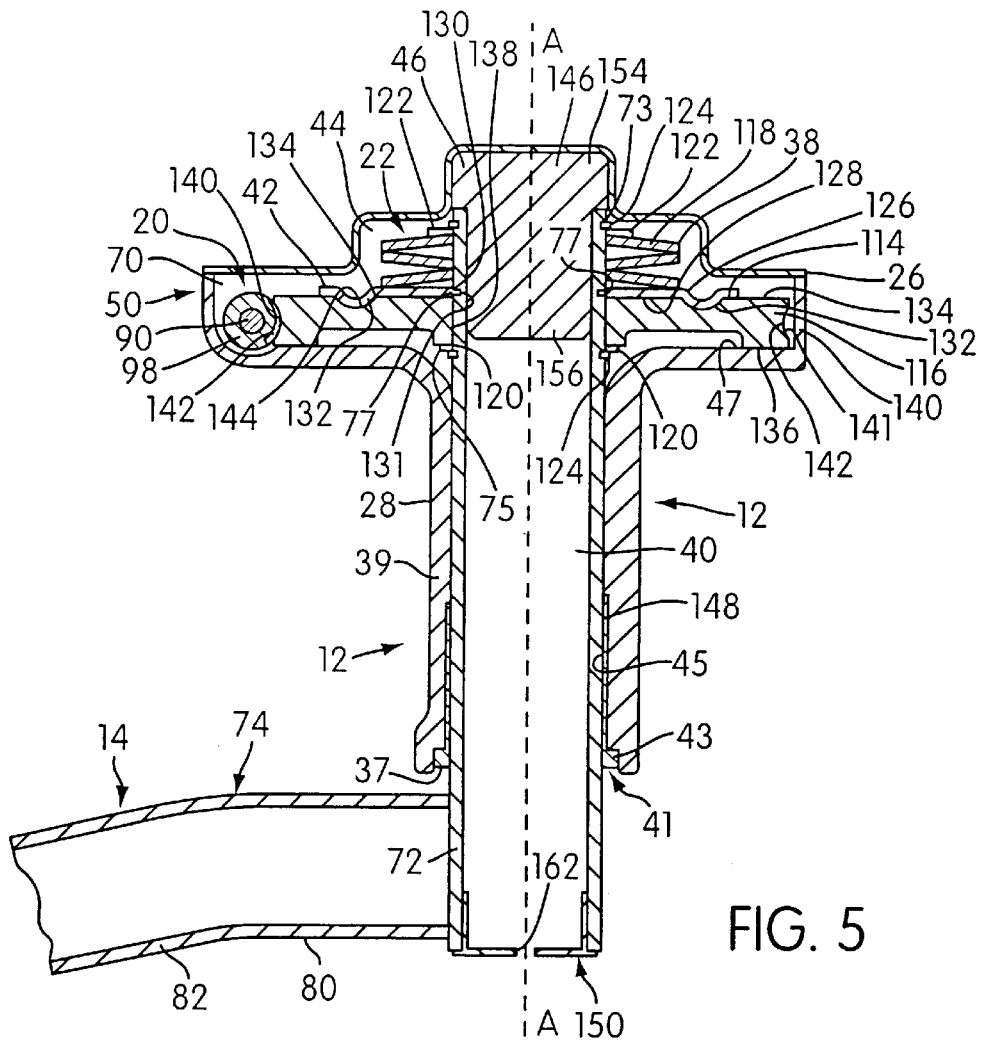
FIG. 5 is a cross sectional view similar to that in FIG. 4, but enlarged to better illustrate various portions thereof.
Figure 7:
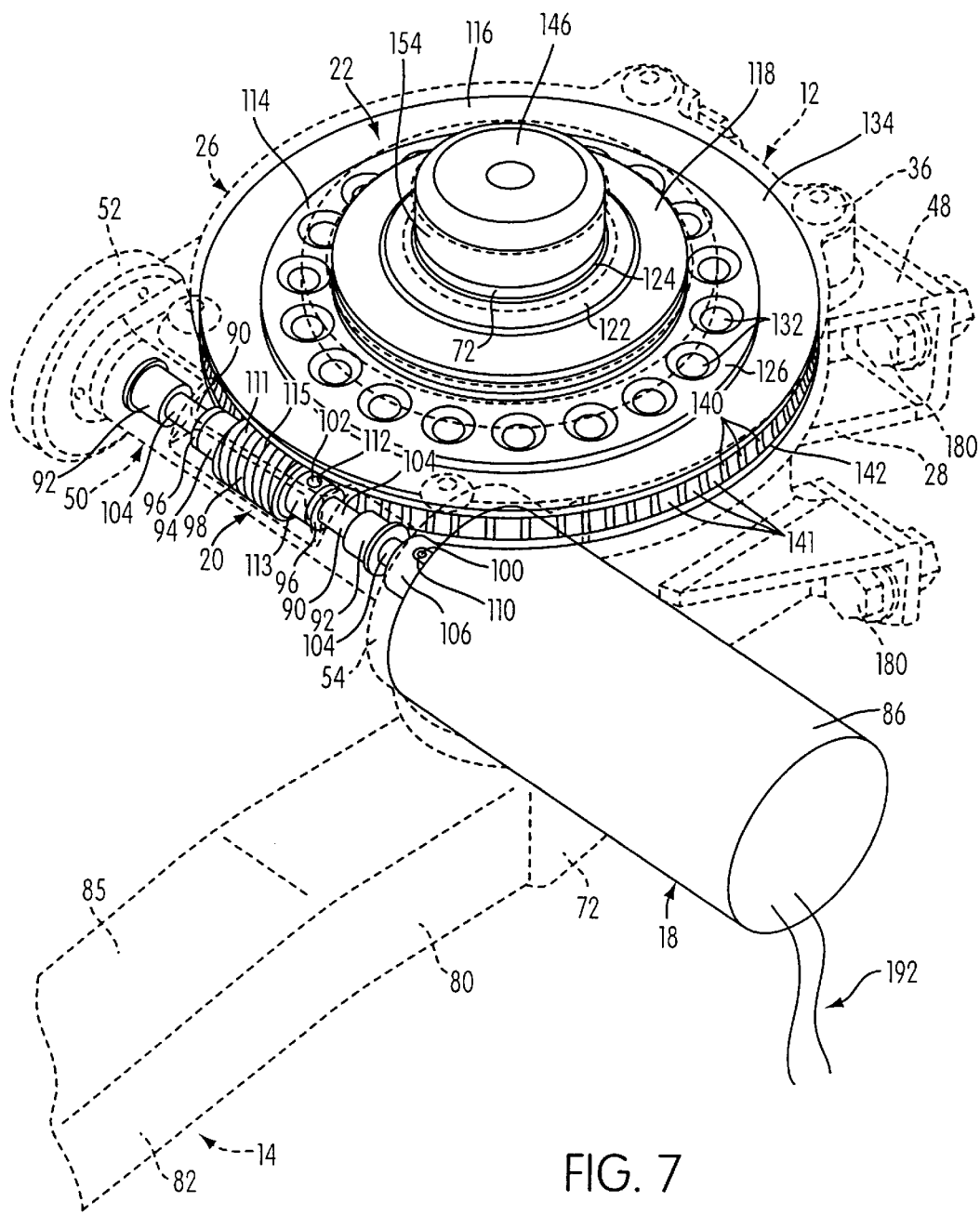
FIG. 7 is an enlarged fragmentary perspective view of a portion of the modular power step assembly, which portion includes the motor assembly, a clutch assembly, and a gear assembly thereof, and showing a housing assembly and a portion of the step assembly in phantom.

The clutch assembly 22 is best seen in FIG. 7 and in the cross-sectional view of FIG. 5. The clutch assembly 22 includes a clutch structure, generally designated 114, a meshing gear structure, generally designated 116, a spring structure 118 comprising a plurality of belleville spring washers, a thrust washer structure 120, an annular shim structure 122, and a pair of retainer ring structures 124. It will be appreciated that while the meshing gear structure 116 forms part of the clutch assembly, it also may be considered to form part of the gear assembly 20.

The clutch structure 114 constitutes a first clutch member connected to the pivoting structure. Preferably, the clutch structure 114 is in the form of a thin disc which has a first substantially planar surface 126 and a second substantially planar surface 128 on opposite sides. The clutch structure 114 further defines a central bore 130 which extends from the first planar surface 126 to the second planar surface 128. A plurality of tab structures 131 are circumferentially spaced along the edge defining the central bore 130 of the clutch structure 114 and are recessed within the broached grooves 77 of rotation tube 72 so as to rotatably couple the clutch structure 114 with the rotation tube 72.

The clutch structure 114 (or first clutch member) has a plurality of circumferentially spaced, integrally formed spherical projections or detents 132. The centers of detents 132 are preferably spaced an equal radial distance from the longitudinal axis of the central bore 130, and project outwardly from the lower or second planar surface 128 of the clutch structure 114. The detents 132 appear as depressions on the upper planar surface 126. In the embodiment of the clutch structure 114. shown in the figures, the clutch structure 114 is formed from stamped sheet metal.

The meshing gear structure 116 comprises a second clutch member driven by motor assembly 18. Preferably, gear structure 116 comprises thick disc which has an upper surface 134, a lower or opposite surface 136, and a central bore 138 which extends through the disc. A plurality of identical and circumferentially spaced tooth-like structures 140 are defined between the upper and lower surfaces 134, 136 at the periphery 142 of the meshing gear structure 116 in a conventional manner. Notches 141 between the tooth-like structures 140 are dimensioned to rotationally receive and to rotationally engage in a conventional manner the plurality of spiral threads 115 defined on the exterior cylindrical surface of the enlarged cylindrical portion 111 of the worm member 98. The worm member 98 and the meshing gear structure 116 are therefore capable of rotational interengagement in a manner well known to one skilled in the art. A plurality of equally spaced spherical depressions 144, the centers of which are spaced an equal radial distance from the longitudinal axis of the central bore structure 138, are formed in the upper surface 134 of the meshing gear structure 116.

As best shown in FIG. 5, the modular power step assembly 10 further includes an upper shaft guide structure, generally designated 146, a plain bearing structure 148, and a lower cap structure, generally designated 150. The upper shaft guide structure 146 has a large diameter cylindrical first end portion 154 at one end thereof, and a smaller diameter portion 156 received within the top of rotation tube structure 72. The plain bearing structure 148 is an elongated tubular cylindrical structure preferably made of nylon or similar material received in recess 45 in sleeve portion 39. Bearing structure 148 mounts the rotation tube structure 72 for rotation within sleeve portion 39 of main housing 28.

The rotation tube structure 72 is prevented from being longitudinally downwardly displaced with respect to the sleeve 39 in a direction away from the cover structure 26 of the housing assembly 12 by the vertical support of the upper retainer ring 124, which is supported by the remainder of the clutch assembly 22, including the shim structure 122, the spring structure 118, the clutch structure 114, the meshing gear structure 116, which is in turn supported by the upward facing surface of the housing structure 28 at the lower surface 136 of the meshing gear structure 116.

The shim structure 122 is mounted around the rotation tube structure 72 and is positioned immediately below the upper retainer ring structure 124 received in the upper annular groove 73. The thrust washer structure 120 is mounted about the rotation tube structure 72 immediately adjacent the lower retainer ring structure 124 received in the lower annular groove 75. The central bore 138 of the meshing gear structure 116 is rotatably mounted about the rotation tube structure 72 on the thrust washer structure 120. Thus, the meshing gear structure 116 is rotatable with respect to both the rotation tube structure 72 and the housing structure 28.

The clutch structure 114 is fixed to the rotation tube structure 72 for rotation therewith. More specifically, the tab structures 131 formed in the cylindrical central bore 130 of the clutch structure 114 engage the broached grooves 77 formed on the rotation tube structure 72 to prevent the clutch structure 114 from rotating with respect to the rotation tube structure 72. The meshing gear structure 116 is, on the other hand, rotatable with respect to the rotation tube structure 72, or vice versa. However, when the spherical detents 132 on the clutch structure 114 are received within the spherical depressions 144 formed in the upper surface of meshing gear structure 116, the clutch 114 couples the tube structure 72 to the gear structure 116 for rotation therewith. The plurality of belleville spring washers constituting the spring structure 118 are mounted about the rotation tube structure 72 between the shim structures 122 and the clutch structure 114. The spring structure 118 biases the clutch structure 114 axially downwardly so that the spherical depressions 144 are held in releasable engagement with the spherical depressions 144 in the meshing gear structure 116. Thus, the respective clutch surfaces of the clutch members 114 and 116 are forced into coupling engagement by the spring structure so that movement of the gear assembly generates corresponding movement of the pivoting structure. The retainer ring structures 124 of the clutch assembly 22 are each rigidly and nonslidably attached to the rotation tube structure 72 to provide support to the shim structure 122 and thrust washer 120 therebetween.

It can be appreciated from FIG. 5 that the axis labeled A therein (hereinafter referred to as "Axis A") is the axis of symmetry of the rotation tube structure 72 and also the axis of rotation of the rotation tube structure 72 of the pivoting structure 14 with respect to the housing assembly 12.

The manner in which the housing assembly 12 of the modular power step assembly 10 is mounted to a vehicle is shown in FIGS. 8–10. In FIG. 8, a fragmentary portion of a representative high clearance vehicle, generally designated 161, is shown in phantom. The high clearance vehicle 161 includes a conventional vehicle frame rail 174. A reference line 176 indicates the orientation and the approximate level of a vehicle floor and a vehicle rocker panel 178. The vehicle floor 176 is essentially parallel to the ground surface (not shown). The vehicle frame rail 174 includes a planar face portion 184 which is essentially vertical and perpendicular with respect to the ground surface. A bottom wall 177 of the frame rail 174 is essentially parallel to the ground surface. As shown in FIGS. 8–10, the rear bracket portion 48 of the housing assembly 12 is secured to the vehicle frame rail 174 on the exterior of the vehicle 161 by a plurality of bolts 180.

FIGS. 8–10 show the housing assembly 12 of the modular power step assembly 10 installed under a vehicle door (not shown) on the right side of a high clearance vehicle 161 relative to a forwardly facing vehicle occupant. The right side of the vehicle 161 is thus the side of the vehicle designated the passenger's side of a vehicle in the United States. In FIGS. 9 and 10, the more forward portion of the vehicle 161 is on the right side of the figure and the more rearward portion of the vehicle 161 is on the left. FIG. 8 shows the modular power step assembly 10 as in FIG. 9; thus, FIG. 8 is an elevation view seen from the point of view of an observer standing on the passenger's side towards the front of the of the vehicle 161 and looking rearwardly in a direction parallel to the planar face portion 184 of the vehicle frame rail. It can be appreciated that FIGS. 8–10 show the pivoting structure 14 in the extended position in solid lines, and that the retracted position of the pivoting structure 14 is shown in phantom lines.

The step structure 76 moves in an arcuate path as it moves between the retracted and the extended positions. The plane defined by this arcuate movement is not parallel to the ground surface due to the compound angling of Axis A of the rotation tube structure 72 of the pivoting structure 14 with respect to a vertical axis as described hereinbelow.

As best seen in FIG. 8, Axis A is angled with respect to a vertical reference axis labeled B in the figures and hereinafter referred to as Axis B. It can be appreciated that Axis B is perpendicular to the ground surface and the vehicle floor, and is parallel to the vertical planar surface 184 of the vehicle frame rail 174. The axis of rotation for the pivoting structure 14, Axis A, is angled so as to extend in an outboard direction as it extends upwards. Axis A is therefore said to be angled in the outboard vehicle direction. The outboard direction is defined as the direction away from the vehicle from a given side of the vehicle 161. The embodiment shown moves the step forwards when extended. As such, Axis A is also angled so that the upper portion thereof is more forward than the lower portion thereof as best shown in FIG. 9. Thus, Axis A is said to be forwardly angled with respect to Axis B. It can therefore be understood that Axis A is angled in both the outboard and forward directions. This is referred to as the compound angling of Axis A. For a contemplated arrangement in which the passenger's side mounted step assembly is to rotate rearwardly when moving from the retracted to extended positions, the Axis A would be angled in the outboard and rearward directions.

The compound angling of Axis A in the embodiment shown is such that the step structure 76 of the pivoting structure 14 moves downwardly and forwardly when pivoting from the retracted position to the extended position. This movement of the step structure 76 along this arcuate path due to the compound angling of Axis A enhances the packageability of the pivoting structure 14. The pivoting structure 14 is under the rocker panel 178 and substantially out of sight when in the retracted position. The compound angling also maximizes the vertical movement of the step structure 76 as it moves pivotally between the retracted and extended positions. As shown in FIG. 8, when the modular power step assembly 10 is in the extended position, the step structure 76 of the pivoting structure 14 is positioned outwardly slightly beyond the rocker panel 178 and below the bottom wall 177 of the vehicle frame rail 174 and the arm structure 74 is essentially perpendicular to the vehicle frame rail 174. In the retracted position shown in phantom in FIG. 8, the pivoting structure 14 is under the rocker panel 178 and the arm structure 74 is essentially parallel to the vehicle frame rail 174. This parallel relation is best seen in FIG. 10 which shows the arm structure 74 in the retracted position in phantom.

The compound angling of Axis A that causes the top surface 79 of the step structure 76 to be essentially horizontal and parallel to both the ground surface and vehicle floor 176 in the extended position, and be slightly angled with respect to the ground surface and the bottom edge 177 (which is parallel to the ground surface) of the vehicle frame rail 174 in the retracted position. The compound angling also positions the step structure 76 relatively closer to the ground surface in the extended position and relatively further from the ground surface in the retracted position. The orientation assumed by the step structure 76 in the retracted position helps to minimize the vertical height occupied by the pivoting structure 14 when retracted and facilitates better storage or "nesting" of the pivoting structure 14 in the area under the vehicle door. This is accomplished without the pivoting structure 14 extending significantly, if at all, below the lowest part of the vehicle frame, which would compromise the ground clearance of the vehicle. In the retracted position, the pivoting structure 14 does not increase the width of the vehicle (see FIG. 8).

It can also be appreciated from FIG. 10 that the asymmetric placement of the step structure 76 on the arm structure 74 of the pivoting structure 14 reduces the space occupied by the pivoting structure 14 in the retracted position. The asymmetric placement of the step structure 76 with respect to the arm structure 74 is an improvement over existing retractable steps, because this asymmetry positions the arm structure 74 and entire housing assembly 12 in close proximity to the vehicle frame rail 174 when the step structure 76 is in the retracted position, with the step side wall 65 parallel to the frame rail face 184. As mentioned previously, the arm structure 74 is essentially parallel to the vertical planar face 184 of the vehicle frame rail 174 in the retracted position, when side wall 65 engages bumper 186. This is best seen in the phantom view of the pivoting structure 14 shown in FIG. 10.

The operation of the modular power step assembly 10 will now be considered. The pivoting structure 14 is bi-directionally movable between the retracted and the extended positions by the motor assembly 18, which is controlled electronically by the logic circuitry within the electronic control unit 16 shown in FIG. 1. The electronic control unit 16 is electromechanically connected to the vehicle door disposed above and operationally associated with the modular power step assembly 10. The electronic control unit 16 causes the pivoting structure 14 to pivot to the extended position when the vehicle door associated therewith is opened, and to pivot to the retracted position when the vehicle door is closed.

The electronic control unit 16 is mounted within the vehicle 161, remote from the housing assembly 12, and is electrically connected to the motor assembly 18, the wiring harness (not shown) of the vehicle 161, and a door actuated switch member 182 which is part of the vehicle door with which the modular power step assembly 10 is associated. In another preferred embodiment (not illustrated), the control unit 16 is physically mounted directly to the housing assembly or to the motor, and is electrically connected to the motor.

The switch member 182 is part of the vehicle 161 and is controlled in a conventional manner by the vehicle door (not shown). The wiring harness supplies the electrical power from the vehicle electrical system to the electronic control unit 16 of the modular power step assembly 10 through the electrical wire members generally designated 190. The structure and operation of a conventional switch member 182 which is operationally interconnected to a vehicle door is well known. It is understood by one skilled in the art that such switch members 182 are toggled by the opening or the closing of the vehicle door associated therewith to open and close an electrical circuit. Wire members generally designated 192 provide electrical connection between the electronic control unit 16 and the motor assembly 18 so that the electronic control unit 16 can supply electrical power from the vehicle electrical system to the motor assembly 18 to effect the bi-directional operation thereof. The wire members generally designated 194 provide electrical communication between the electronic control unit 16 and the vehicle door switch member 182.

In a preferred embodiment, the switch 182 is a door ajar switch in the door latch. The motor assembly 18 is energized to move the pivoting structure from the stored position to the deployed position upon receiving a signal from the door ajar switch 182 indicating that the vehicle door has been opened. The motor assembly is energized to return the pivoting structure to the stored position upon receiving a signal from the door ajar switch indicating that the vehicle door has been closed.

When the pivoting structure 14 is in the retracted position and the vehicle door is unlatched and pivoted outwardly from the closed to the open position, the switch member 182 associated therewith is activated and sends a contact signal to the electronic control unit 16. The electronic control unit 16 in response to this first control signal supplies an appropriate voltage to the motor assembly 18 to cause the motor assembly 18 to begin rotational movement in a first rotational direction which will move the pivoting structure 14 to the extended position. Specifically, the motor shaft structure 88 of the motor assembly 18 rotates the worm drive shaft member 90 in a first rotational direction which in turn rotates the worm member 98. The worm member 98 rotates the meshing gear structure 116. The gear structure 116, in turn, through the engagement between the spherical depressions 144 thereof and the spherical detents 132 on the clutch structure 114, rotates the clutch structure 114. Rotation of clutch structure 114 rotates the rotation tube structure 72. This causes the pivoting structure 14 to pivot outwardly toward the extended position.

In one embodiment, a position encoder (not shown) in the motor assembly 18 detects when the pivoting structure 14 reaches the extended position, at which point the electronic control unit 16 turns off the electrical motor in the motor assembly 18. The pivoting structure 14 remains in the extended position so that the step structure 76 thereof can be used by those entering or leaving the vehicle 161.

Figure 11:
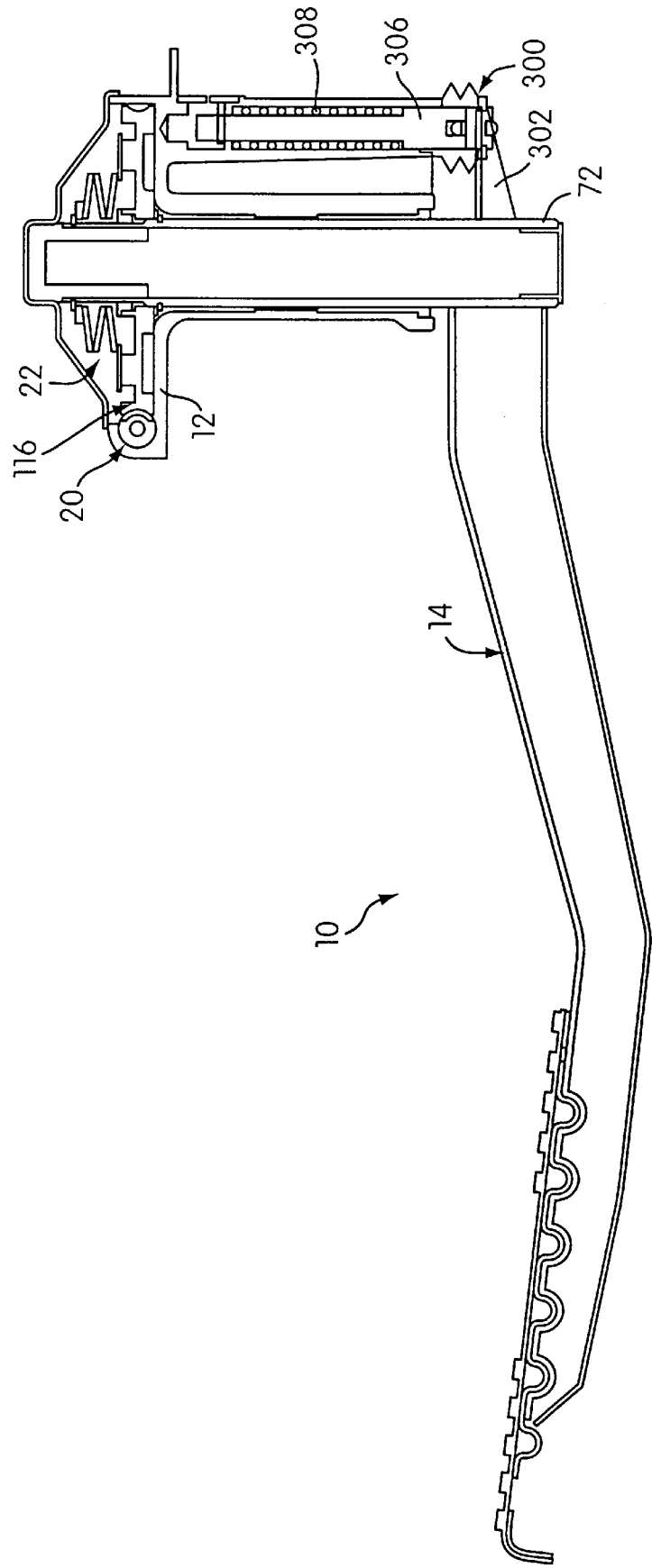
FIG. 11 is a cross-sectional view similar to FIG. 4, but illustrating another preferred embodiment of the present invention, wherein a spring-biased stop structure is employed to terminate movement of the step assembly in the deployed position.
Figure 12:
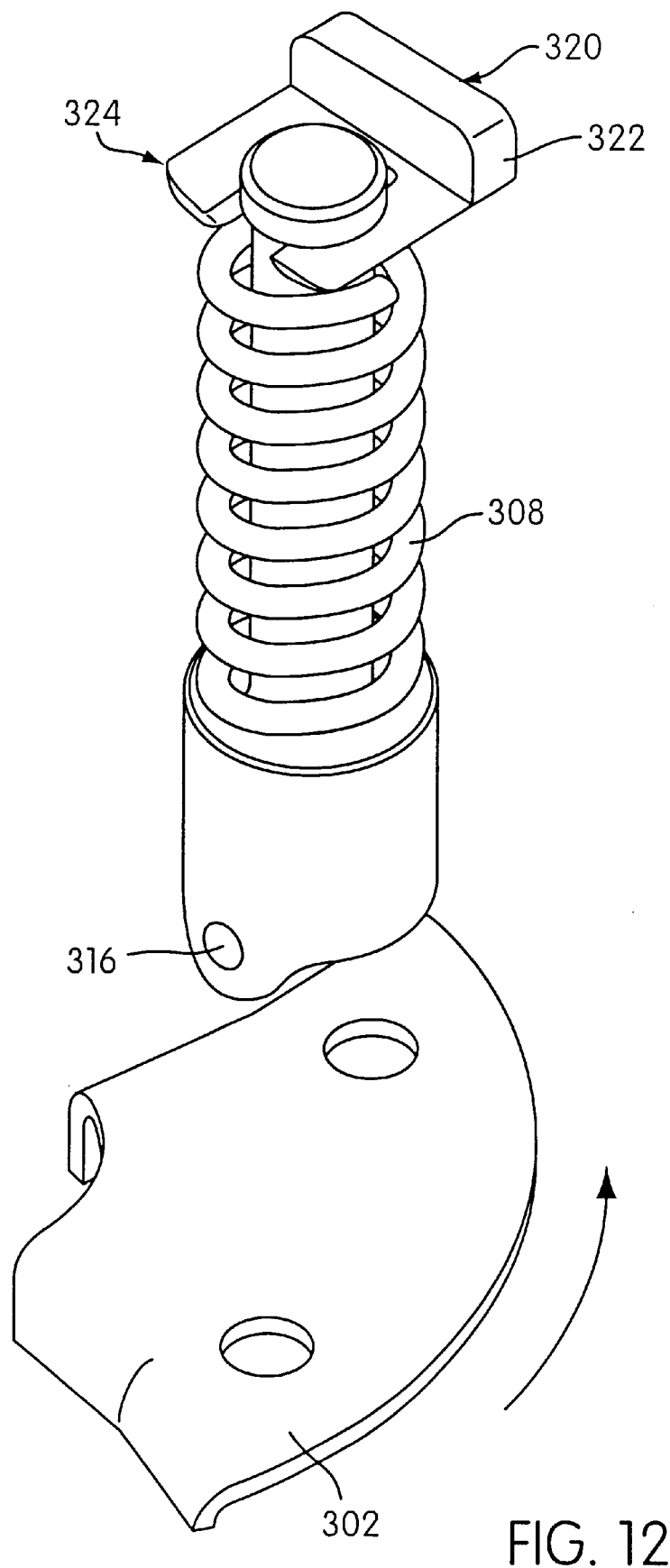
FIG. 12 is an enlarged perspective view of the stop structure utilized in the embodiment illustrated in FIG. 11.
Figure 13:
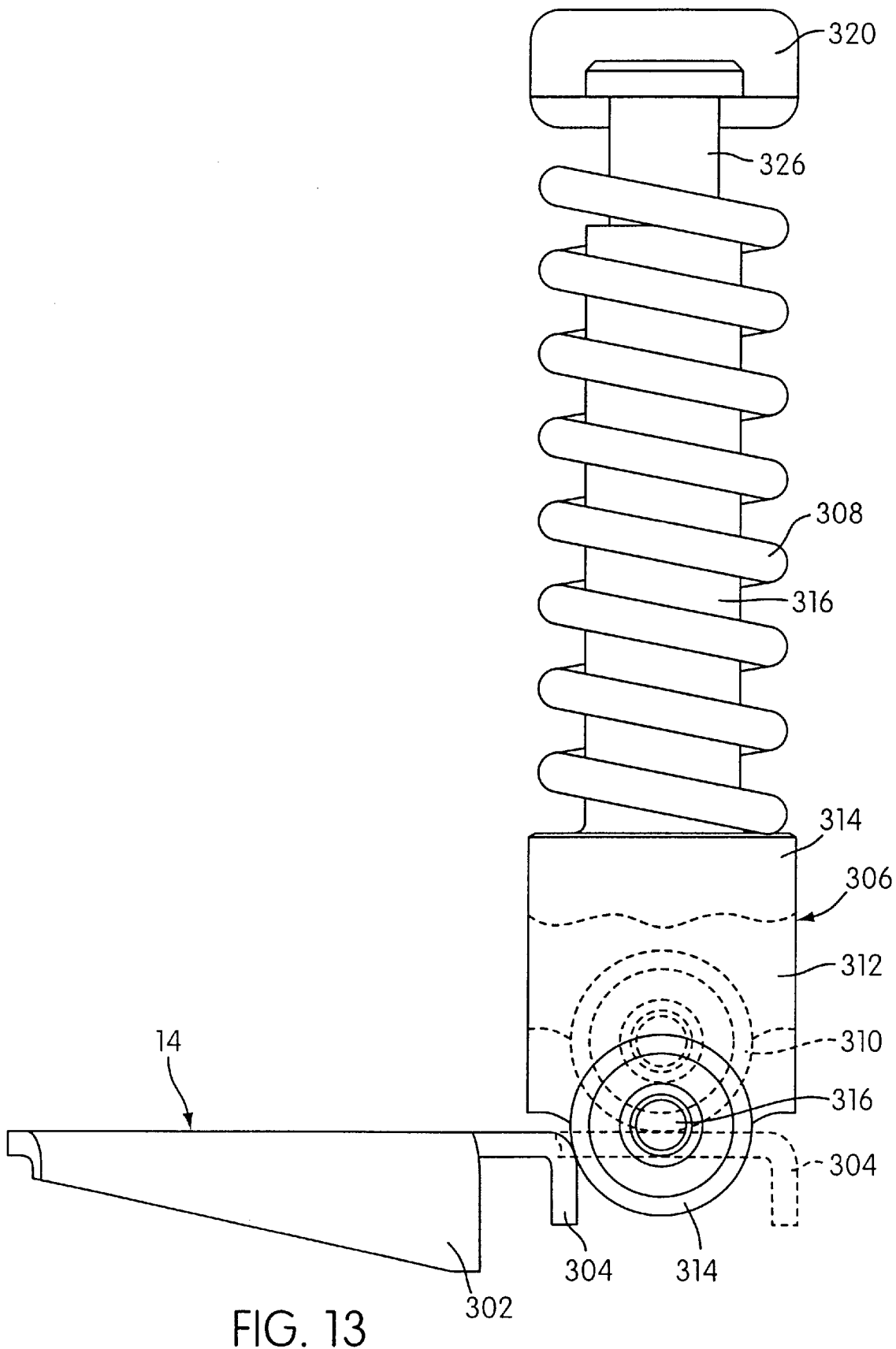
FIG. 13 is a side view of the stop structure utilized in the embodiment illustrated in FIG. 11.

In a more preferred embodiment, as illustrated in FIGS. 11–13, a stop structure 300 and the controller 16 are used to turn-off the electrical motor of the motor assembly 18. This eliminates the need for an encoder. Particularly, the stop structure 300 is engaged by said pivoting structure 14 when the pivoting structure 14 is in said deployed position. More particularly, the pivoting structure 14 is provided with a sector plate structure 302 having a radially inner edge that is welded to the tubular member 72. The sector plate structure 302 has a downardly depending flange 304 at a forward end there of that engages the stop structure 300, as will be described.

As discussed with previous embodiment, the embodiment of FIGS. 11–13 also provides gear assembly 20 that comprises a worm member or worm gear 98 operatively connected to the motor assembly 18, and the meshing gear 116 is operatively connected to the pivoting structure 14. The worm gear 98 and the meshing gear 116 are disposed in cooperative meshing engagement relation.

The motor assembly 18 is operable in a first driving direction to drive the worm gear 98 and hence the meshing gear 116 and the pivoting structure 14 from the stored position to the deployed position. The pivoting structure 14, preferably the sector plate structure 302 thereof, engages the stop structure 300 when the pivoting structure reaches the deployed position. A current spike is generated in the motor assembly 18 as a result of the motor assembly 18 meeting a resistance to movement when the pivoting structure 14 engages the stop structure 300. The controller 16 senses the current spike and turns off the motor assembly 18 in response to the current spike.

The pivoting structure 14 is retained in the deployed position after the motor assembly is shut off as a result of the meshing engagement between said worm gear 98 and the meshing gear 116, as it is known that a worm gear 98 will not be back-driven by a meshing gear. Thus, the worm gear will resist an external force applied to the pivoting structure in a direction away from the deployed position and towards the stored position as a result of the meshing engagement.

A movable structure 306 is disposed at an interface between the stop structure 300 and said pivoting structure 14. As best shown in FIG. 13, the movable structure 306 is biased by a coil spring member 308 towards a first position wherein the movable structure 306 prevents movement of the pivoting structure. 14 beyond the deployed position. The movable structure 306 is movable against the bias of the spring member 308 to a second position (see phantom line configuration 310) that permits movement of the pivoting structure 14 beyond the deployed position.

Preferably, the movable structure 306 and the spring 308 form part of the stop structure 300. It is contemplated, however, that a movable structure and spring can be provided on the pivoting structure for engagement with a fixed stop structure in order to achieve the desired effect.

The spring member applies a biasing force to the movable structure 306 that is sufficiently large to oppose the force of the motor assembly 18 so as to create the current spike in the motor assembly 18 and thereby prevent movement of the movable structure 306 to the second position under the force of the motor assembly 18.

The biasing force of the spring member 308 permits movement of the movable structure 306 to the second position to enable the pivoting structure 14 to move beyond the deployed position when an external force applied to the pivoting structure exceeds the force applied by the motor assembly by greater than a threshold amount. In this manner, if the pivoting structure is impacted or forced to a sufficiently great extent in a direction beyond the deployed position, the spring member 308 will permit such movement to prevent damage to the step assembly components.

As discussed above, in the preferred embodiment, the stop structure 300 incorporates the movable structure 306 and spring 308. Particularly, the movable structure comprises a rod member 312 having a lower end that secures a rotatable wheel 314. The rotatable wheel 314 is secured to the rod member 312 by a pin 316 about which the wheel 314 rotates. The wheel 314 forms the portion of the stop structure which engages the flange portion 304 of the pivoting structure 14. When the pivoting structure 14 is forced with a greater than the threshold force towards the second position (beyond the deployed position), the flange 304 cams the wheel 314 in an upward direction against the force of coil spring 308. The wheel 314 rotates during this camming action and then rides along the upper surface of the sector plate structure 302.

The spring 308 has a lower end seated against an enlarged diameter portion 314 of the rod 312, and an intermediate diameter portion 316 of the rod extends through the coils of spring 308. The rod 312 may be formed from a hard plastic or stainless steel material. The upper end of spring 308 is preferably fixed to the housing assembly 12. The upper end of the rod 312 is preferably mounted to a retaining block 320, which retaining block has one end 322 preferably fixed to the housing assembly. The retaining block 320 is preferably made from a plastic material.

As best shown in FIG. 12, the retaining block 320 has a fork structure 324 at another end thereof, which fork structure 324 slidingly receives a narrow diameter portion 326 of the upper end of rod 312. This sliding relation between the rod 312 and retaining block 320 permits the rod 312 to slide upwardly when the wheel is cammed upwardly as illustrated in FIG. 13.

The pivoting structure 14 remains in the extended position until the door of the vehicle is closed. This activates the switch member 182 associated with the vehicle door to send a second control signal to the electronic control unit 16. The electronic control unit 16, in response to this second control signal, causes the electrical motor in the motor assembly 18 to move in a second rotational direction opposite the first direction. This rotates the worm member 98, the meshing gear structure 116, and the clutch structure 114 in the direction that causes the rotation tube structure 72 to move the arm structure 74 and the step structure 76 towards the retracted position adjacent the vehicle frame rail 174. The electric motor in the motor assembly 18 retracts the pivoting structure 14 until the step structure 76 thereof contacts the stop member 186 mounted on the vehicle frame rail 174 at which point a current spike is created in the electrical motor of the motor assembly 18. The current spike will be instantaneously detected by the electronic control unit 16. In response to the current spike, the control unit 16 turns off the electric motor of the motor assembly 18.

In the first embodiment, the control unit 16 will also reset the position encoder in response to the current spike. Thus, in the first-described embodiment, it can be appreciated that each time the pivoting structure 14 returns to the retracted position, the electronic control unit 16 provides a zeroing of the position encoder and shutoff for the motor in response to the spiking motor current.

The modular power step assembly 10 includes a number of safety features that protect both the vehicle user and the mechanical structure of the assembly 10. For example, whenever the electric motor assembly 18 is supplied with current from the electronic control unit 16 to rotate the pivoting structure 14, the motor current is continuously monitored by the electronic control unit 16. This information is used by the electronic control unit 16 to provide an electronically controlled obstruction detection safety feature during the extension and retraction of the pivoting structure 14. More specifically, the pivoting structure 14 will safely deploy without applying an excessive force to an obstacle that may be in the arcuate path of the pivoting structure 14 when it is being rotated by the electric motor of the motor assembly 18. If the pivoting structure 14 encounters an obstruction as it is being extended or retracted, the motor current will rise due to the increased load on the motor. When the electronic control unit 16 detects a current passing through the motor that is outside of its characteristic range, the electronic control unit 16 will instantly turn off the motor. The obstruction causes the current to rise to a level outside of the characteristic range before the motor applies the maximum stall torque to the object causing the obstruction. This ensures that the motor does not force the pivoting structure 14 against an object or person with the maximum stall torque of the motor. It is within the scope of the present invention to modify the electronic control unit to vary the level or magnitude of the uncharacteristic current required to cause the electronic control unit to instantaneously reverse direction of the motor to counteract the inertia of the system and cause a dynamic breaking action for stopping the motor. Following an emergency shut off of the motor caused by an obstruction, the pivoting structure will return to the retracted position upon closing the vehicle door and actuation of switch 182. At this point, the current spike in motor assembly 18 will be detected by the electronic control unit 16. This will, in response, turn off the electric motor of the motor assembly 18 and reset the position encoder.

As another feature, the spring loaded clutch assembly 22 provides a breakaway feature under high load, which ensures that the internal components of the assembly are not damaged should an excessive torque be applied to the pivoting structure 14 which torque would tend to rotate the rotation tube structure 72 about axis A. More specifically, the internal clutch assembly 22 allows the pivoting structure 14 to rotate relative to the meshing gear structure 116 if an excessive force is applied to the step structure 76 or arm structure 74. The clutch assembly 22 will release gear structure 116 upon the application of a predetermined threshold release torque applied about the rotation tube structure 72 of the pivoting structure 14.

The disengagement or release occurs between the clutch structure 114 and the meshing gear structure 116 when the release torque can overcome the clutch spring force of belleville spring washer structures 118, which provide the axially directed force necessary to maintain clutch structure 114 in rotational engagement with the meshing gear structure 116 under normal operating loads. Specifically, the belleville spring washer structures 118 are normally held in an axially compressed condition by the cooperation of the retainer ring structure 124 in the upper annular groove structure 73 on the rotation tube structure 72 and the clutch structure 114. If a torsional force of sufficient magnitude, referred to herein as the pre-defined release torque or force to overcome the force of the spring structure 118, is applied to the pivoting structure 14, this release torque causes the clutch structure 114 and its spherical detents 132 to cam upwardly out of engagement with the spherical depressions 144 against the spring force supplied by the belleville spring washer structures 118. This disengagement will allow the pivoting structure 14 to rotate until the clutch structure 114 engages the next incremental detent position. This disengagement will prevent the internal components of the clutch assembly 22 and the gear assembly 20 from being damaged.

In the first embodiment that includes the encoder, if the pivoting structure 14 and the clutch structure 114 secured thereto are rotated by disengaging the clutch structure 114 from the meshing gear structure 116, the actual position of the pivoting structure 14 will not correspond with the position encoded for the pivoting structure 14 by the motor assembly 18. The modular power step assembly 10 adjusts for this as the position encoder is reset to zero when the pivoting structure 14 is returned to the retracted position after the vehicle door is closed and a current spike occurs in the electric motor.

It can also be appreciated that the clutch assembly 22 enables the vehicle user to rotate the pivoting structure 14 manually between the extended or retracted positions in case the vehicle power system fails. This can be accomplished by applying a manual rotational force on the pivoting structure 14 to cause a torsional force about Axis A of the rotation tube structure 72 that is greater than the torsional force required to release the clutch assembly. When a torsional force greater than that required to release the clutch assembly is applied to the pivoting structure 14, the torque causes the spherical detents 132 of the clutch structure 114 to cam upwardly out of engagement with the spherical depressions 144 in the meshing gear structure 116 against the spring force applied by the belleville spring washer structures 118. This disengagement will allow the pivoting structure 14 to rotate about Axis A against the relatively small frictional force between spherical detents and the planar surface 134 of the meshing gear structure 116 until the spherical detents of the clutch structure 114 engage in the next incremental detent position. It can be appreciated that by repeating this process of manually applying the pre-defined release torque to the pivoting structure 14, and then pivoting the pivoting structure 14 to the next incremental detent position, the pivoting structure 14 can be manually moved back and forth between the extended and retracted positions.

The torsional force required to release the clutch assembly and cause rotation of the clutch structure 114 with respect to the meshing gear structure 116 is a design choice. The torsional force required to release the clutch assembly can be varied over a wide range by altering the spring force applied by spring washers 118.

The modular power step assembly 10 includes housing components that protect the internal mechanical components from thereof inside the housing assembly 12 from dirt and environmental damage. Particularly, the gear assembly 20 and the clutch assembly 22 are fully enclosed within the housing assembly 12 by the cooperation of the cover structure 26 and the housing structure 28. The bellhouse seal structure 152 seals the end of the bellhouse bore 56 opposite the motor assembly 18 and prevents dirt and moisture from entering the bellhouse bore 56. The bellhouse seal structure 152 can seal whichever end of the bellhouse bore 56 that is opposite motor assembly 18. The lower cap structure 150 is plastic and prevents the environmental elements from entering the bottom of the rotation tube structure 72. The central aperture 162 formed in the lower cap structure 150 allows water inside the rotation tube structure 72 to drain or evaporate. The lower spring loaded lip seal 37 keeps foreign material from entering the housing assembly 12 from below that would cause wear on the rotational surface of the plain bearing structure 148 or other components.

It can be appreciated from the passenger's side mounted embodiment of FIGS. 8–10, the housing assembly 12 is symmetric and, because the motor assembly 18 can be attached to either the first bellhouse structure 52 or the second bellhouse structure 54 of the gear housing portion 50 of the housing assembly 12, the housing assembly 12 can easily be configured for installation on either side of the vehicle 161. Furthermore, because the step structure 76 can be attached to the arm structure 74 by placing the short third arm portion 84 in either the first or the second notches 83, 87 of the step structure 76, the pivoting structure 14 can be easily reconfigured to form a mirror image of itself. Consequently, it can be appreciated that the same exact component forming the pivoting structure 14 and the housing assembly 12 can be easily reconfigured for installation on either side of the vehicle.

More specifically, the housing assembly 12 and the pivoting structure 14 associated therewith shown in FIGS. 8–10 are installed on the passenger's side of the vehicle 161. The motor assembly 18 is secured to the second bellhouse structure 54 of the bellhouse portion 50 of the housing assembly 12. The arm structure 74 is secured to the step structure 76 using notch 83. In this configuration, the electronic control unit 16 operates the electric motor so that the pivoting structure 14 pivots forwardly to move from the retracted to the extended position.

The pivoting structure 14 shown in FIGS. 8–10 could be reconfigured to form a housing assembly 12 and pivoting structure 14 that would have a rearward movement when moving from the retracted to the extended positions or the passenger's side of the vehicle. Specifically, the motor assembly 18 could be secured to the first bellhouse structure 52 instead of the second bellhouse structure 54, and the arm structure 74 of the pivoting structure 14 could be secured to the step structure 76 using notch 87. This would create the mirror image embodiment of both the housing assembly 12 and the pivoting structure 14. This mirror image embodiment would have an Axis A that is angled outboard and rearward. In this mirror image embodiment, it can be appreciated that the arm structure 74 would be relatively near the vehicle frame rail 174 in the retracted position because the arm structure 74 is in the second notch structure 87. This same alternate mirror image configuration can be used for the driver's side of the vehicle as a unit which moves forwardly when moving from the retracted to extended position.

It can therefore be appreciated from FIG. 9 that in the configuration of the housing assembly 12 and the step structure 76 shown therein, the step structure 76 moves from the retracted to the extended positions by pivoting forwardly. It can also be appreciated that if this configuration of the modular power step assembly 10 were to be installed on the driver's side of a vehicle, the step structure 76 would pivot rearwardly to move from the retracted to the extended position. It can also be understood that it is within the scope of the invention to provide a power step assembly 10 having a pivoting structure 14 that can be adapted to move from the retracted to the extended position by moving either forwardly or rearwardly as preferred by the manufacturer. It is well known in the art that logic circuitry in the electronic control unit 16 and motor assembly 18 can easily be modified to pivot the pivoting structure 14 in the desired manner.

It is contemplated that one or more of the doors of the high clearance vehicle can be provided with a power step assembly 10. One electronic control unit 16 can independently supply power to and control a plurality of motor assemblies 18, each associated with one door. The electronic control unit 16 shown in FIG. 1 can accommodate a plurality of motor assemblies 18 through the plurality of pairs of electrical wires generally designated 192a and a plurality of vehicle door switch members 182 through the plurality of pairs of electrical wires generally designated 194a. In another preferred embodiment, each step assembly has its own control unit for controlling the motor assembly associated herewith.

As noted previously, by angling Axis A in the forward direction for a forwardly opening pivoting structure 14 or in the rearward direction for a rearwardly opening pivoting structure 14, the step can be made to move a greater vertical distance downward as it moves to the extended position. In addition, because the top surface 79 of the step structure 76 is generally horizontal in the extended position, by angling Axis A approximately equal amounts in the outboard and forward directions for a forwardly opening step, or in the outboard and rearward directions for a rearward opening step, the pivoting structure 14 can be designed kinematically to be flat in the deployed position and perpendicular to the frame rail (flat in the cross-car direction) in the retracted position. This allows the pivoting structure 14 to take up less vertical space in the retracted position and maximize ground clearance of the vehicle.

It thus will be seen that the objects of this invention have been fully and effectively accomplished. It will be realized, however, that the foregoing preferred embodiment of the present invention has been showed and described for the purposes of illustrating the principles of the invention and is subject to change without departure from such principles. Therefore, this invention includes all modifications encompassed within the spirit and scope of the following claims and all equivalents thereof.

What is claimed is:

1. A power-retractable step assembly for a motor vehicle comprising:

a substantially sealed housing assembly;

a pivoting structure including a step structure;

said step structure presenting an upper load carrying surface;

said pivoting structure mounted for pivotal movement about an axis;

a gear assembly disposed in said sealed housing assembly and coupled to said pivoting structure;

a motor assembly drivingly coupled with said gear assembly, said motor assembly constructed and arranged to pivot said pivoting structure about said axis and thereby drive said pivoting structure between deployed and stored positions, said step structure being moved in an outboard vehicle direction when said pivoting structure is moved from said stored position to said deployed position, said step structure also being moved in a fore-aft vehicle direction when said pivoting structure is moved between said stored and deployed positions, said axis being disposed at an angle such that, as said axis extends upwardly, i) said axis extends in said outboard vehicle direction and ii) said axis extends in a same fore-aft vehicle direction as the fore-aft direction that said step structure moves when said pivoting structure is moved from said stored position to said deployed position.

2. A retractable step assembly according to claim 1, wherein said step structure moves in a forward direction when said pivoting structure is moved from said stored position to said deployed position, and moves in a rearward direction when said pivoting structure is moved from said deployed position to said stored position, said axis extending in said outboard vehicle direction and said forward vehicle direction as it extends upwardly.

3. A retractable step assembly according to claim 1, wherein said step structure moves in a rearward direction when said pivoting structure is moved from said stored position to said deployed position, and moves in a forward direction when said pivoting structure is moved from said deployed position to said stored position, said axis extending in said outboard vehicle direction and said rearward vehicle direction as it extends upwardly.

4. A retractable step assembly according to claim 1, further comprising a spring biased clutch assembly coupling said motor assembly with said pivoting structure, said clutch assembly including a first clutch member connected to said pivoting structure and a second clutch member driven by said motor assembly, said clutch assembly further comprising spring structure biasing said first and second clutch members into engagement so that movement of said second clutch member when driven by said motor assembly is translated into movement of said first clutch member for movement of said pivoting structure and said step structure thereof.

5. A retractable step assembly for a motor vehicle according to claim 1, further comprising a mounting bracket constructed and arranged to mount said retractable step assembly on a first side frame rail for the motor vehicle, said pivoting structure further comprising a mounting arm, said mounting arm having a first end fastened to said step structure and a second end being driven for pivotal movement about said axis, further comprising fasteners constructed and arranged to fix said step structure to said first end of said mounting arm, wherein said step structure has first mounting recesses asymmetrically provided on a first portion of said step structure to enable said fasteners to asymmetrically mount said step structure on said mounting arm and thereby enable said mounting arm to be disposed in relatively closer relation to said first side frame rail when said pivoting structure is in a first stored position on one side of the vehicle in comparison with an arrangement wherein said step would be symmetrically mounted with respect to said mounting arm, said step structure having second mounting recesses asymmetrically provided on a second portion of said step structure, so that when said mounting bracket is mounted on a second side frame rail on an opposite side of said vehicle relative to said first side frame rail, said fasteners can asymmetrically mount said step structure in a manner which enables the mounting arm to be disposed in relatively closer relation to said second side frame rail, when said pivoting structure is in a second stored position on an opposite side of the vehicle in comparison with said arrangement wherein said step structure would be symmetrically mounted with respect to said mounting arm.

6. A retractable step assembly for a motor vehicle according to claim 1, further comprising a stop structure which is engaged by said pivoting structure when said pivoting structure is in said deployed position, said gear assembly comprising a worm gear operatively connected to said motor assembly and a meshing gear operatively connected to said pivoting structure, said worm gear and said meshing gear disposed in cooperative meshing engagement relation, said motor assembly being operable in a first driving direction to drive said worm gear and hence said meshing gear and said pivoting structure from said stored position to said deployed position, said pivoting structure engaging said stop structure when said pivoting structure reaches said deployed position, a current spike being in said motor assembly as a result of a resistance to motor assembly movement provided by said stop structure, said motor assembly constructed to shut-off as a result of said current spike, said pivoting structure being retained in said deployed position after said motor assembly is shut off as a result of the meshing engagement between said worm gear and said meshing gear, said worm gear resisting an external force applied to said pivoting structure in a direction away from said deployed position and towards said stored position as a result of said meshing engagement.

7. A power-retractable step assembly according to claim 4, wherein said pivoting structure further comprises a mounting arm having a first end fixed to said step structure, and a tubular structure fixed to a second end of said mounting arm, said tubular structure being rotatable about said axis.

8. A power-retractable step assembly according to claim 7, wherein said second clutch member is connected to said tubular structure so as to rotate said tubular structure when driven by said motor assembly.

9. A power-retractable step assembly for a motor vehicle according to claim 1, wherein said motor assembly is constructed and arranged to be connected with a door ajar switch in said latch, said motor assembly being energized to move said pivoting structure from said stored position to said deployed position upon receiving a signal from said door ajar switch indicating that the vehicle door has been opened, said motor assembly being energized to return said pivoting structure to said stored position upon receiving a signal from said door ajar switch indicating that the vehicle door has been closed.

10. A power-retractable step assembly for a motor vehicle according to claim 6, further comprising a movable structure disposed at an interface between said stop structure and said pivoting structure, and a spring member biasing said movable structure towards a first position wherein said movable structure prevents movement of said pivoting structure beyond said deployed position, said movable structure being movable against the bias of said spring member to a second position which permits movement of the pivoting structure beyond said deployed position, said spring member applying a biasing force to said movable structure that is sufficiently large to oppose the force of said motor assembly so as to create said current spike in said motor assembly and thereby prevent movement of said movable structure to said second position under the force of said motor assembly, said biasing force of said spring member permitting movement of said movable structure to said second position to enable said pivoting structure to move beyond said deployed position when an external force applied to said pivoting structure exceeds the force applied by said motor assembly by greater than a threshold amount.

11. A power-retractable step assembly according to claim 10, wherein said movable structure and said spring member form part of said stop structure.

12. A power-retractable step assembly for a motor vehicle comprising:

a pivoting structure including a step structure, said step structure presenting an upper load carrying surface, a gear assembly coupled to said pivoting structure;

a motor assembly drivingly coupled with said gear assembly, said motor assembly constructed and arranged to pivot said pivoting structure about said axis and thereby drive said pivoting structure between deployed and stored positions, said step structure being moved in an outboard vehicle direction when said pivoting structure is moved from said stored position to said deployed position, said step structure also being moved in a fore-aft vehicle direction when said pivoting structure is moved between said stored and deployed positions, said gear assembly including a worm gear operatively connected to said motor assembly and a meshing gear operatively connected to said pivoting structure, said worm gear and said meshing gear disposed in cooperative meshing engagement relation that prevents said pivoting structure from backdriving said motor assembly so that said pivoting structure is retained in said deployed position and is inhibited from returning to said stored position after it has reached the deployed position, a spring biased clutch assembly coupling said gear assembly with said pivoting structure, said spring biased clutch assembly including clutch surfaces normally forced into coupling engagement by a spring structure so that movement of said gear assembly generates corresponding movement of said pivoting structure, said clutch surfaces being capable of relative movement to one another when said pivoting structure is in said deployed position and a greater than threshold force is applied to said pivoting structure to overcome the force provided by said tension spring and thereby enable said pivoting structure to be moved relative to said gear assembly and thus moved towards said stored position.

13. A power-retractable step assembly according to claim 12, wherein said clutch assembly comprises a first clutch member connected to said pivoting structure and a second clutch member forming part of said gear assembly and driven by said motor assembly, said spring structure biasing said first and second clutch members into engagement so that movement of said second clutch member when driven by said motor assembly is translated into movement of said first clutch member and hence said pivoting structure.

* * * * *